United States Patent [19]
Jerbic

[11] Patent Number: 5,422,762
[45] Date of Patent: Jun. 6, 1995

[54] METHOD AND APPARATUS FOR OPTIMIZING DISK PERFORMANCE BY LOCATING A FILE DIRECTORY ON A MIDDLE TRACK AND DISTRIBUTING THE FILE ALLOCATION TABLES CLOSE TO CLUSTERS REFERENCED IN THE TABLES

[75] Inventor: Stephen M. Jerbic, Cupertino, Calif.

[73] Assignee: Hewlett-Packard Company, Palo Alto, Calif.

[21] Appl. No.: 272,929

[22] Filed: Jul. 11, 1994

Related U.S. Application Data

[63] Continuation of Ser. No. 954,956, Sep. 30, 1992, abandoned.

[51] Int. Cl.6 ................................................ G11B 5/09
[52] U.S. Cl. ........................................ 360/48; 395/600
[58] Field of Search ................... 360/48, 60, 27, 49, 360/109, 61, 72.2, 72.1; 395/425, 600, 575, 400; 364/DIG. 1, 900; 369/47, 48, 32, 275.3; 371/38; 318/254; 379/74

[56] References Cited

U.S. PATENT DOCUMENTS

| | | | |
|---|---|---|---|
| 3,644,812 | 2/1972 | Bitto et al. ........................ 318/254 |
| 4,071,867 | 1/1978 | Pejcha ............................... 360/109 |
| 4,229,808 | 10/1980 | Hui ..................................... 360/48 X |
| 4,535,439 | 8/1985 | Satoh et al. ....................... 369/275 |
| 4,709,367 | 3/1986 | Grafe et al. ....................... 360/60 X |
| 4,712,204 | 12/1987 | Takemura et al. ................ 369/32 |
| 4,747,126 | 5/1988 | Hood et al. ....................... 379/74 |
| 4,941,059 | 7/1990 | Grant ................................. 360/72.1 |
| 4,974,197 | 11/1990 | Blount et al. ..................... 364/900 |
| 4,980,882 | 12/1990 | Baer et al. ......................... 369/275.3 |
| 5,008,820 | 4/1991 | Christopher et al. ............ 395/600 |
| 5,029,125 | 7/1991 | Sciupac ............................. 395/600 |
| 5,086,502 | 2/1992 | Malcolm ........................... 364/DIG. 1 X |
| 5,267,311 | 11/1993 | Bakhoum .......................... 360/60 X |
| 5,327,563 | 7/1994 | Singh ................................. 395/700 |

FOREIGN PATENT DOCUMENTS 61-90770 8/1986 Japan .
63-181178 7/1988 Japan .
63-247980 10/1988 Japan .

*Primary Examiner*—A. Psitos
*Assistant Examiner*—Patrick Wamsley

[57] ABSTRACT

The present invention achieves improved disk response performance by optimizing the placement of the disk sectors associated with the directory and File Allocation Tables (FATs) on the drive. The physical sectors associated with the directory are located approximately on the middle track of the disk and the FAT sectors are relocated adjacent to the track groups the FAT sectors serve. This novel placement of sectors effectively reduces the disk head seek time and effectively reduces the rotational latency compared to the prior art.

12 Claims, 9 Drawing Sheets

METHOD AND APPARATUS FOR OPTIMIZING DISK PERFORMANCE BY LOCATING A FILE DIRECTORY ON A MIDDLE TRACK AND DISTRIBUTING THE FILE ALLOCATION TABLES CLOSE TO CLUSTERS REFERENCED IN THE TABLES

CROSS REFERENCE TO RELATED APPLICATION

This application is a continuation of application Ser. No. 07/954,956, filed Sep. 30, 1992, now abandoned.

BACKGROUND

The present invention relates to disk systems for use in digital computers. In particular this invention is an apparatus and method for improving the response performance of a disk drive system. This response improvement is achieved by the optimized placement of disk sectors associated with a directory, and File Allocation Tables, on the disk drive.

Personal computers have gained widespread acceptance today and millions of personal computers are in use in businesses and homes. While many operating systems are available for these computers, the Microsoft Disk Operating System (MS-DOS) is a leading operating system currently in use. MS-DOS is also marketed under other brand names. For example, the IBM Personal Computer Disk Operating System (PC-DOS) is, with minor exceptions, a relabeled MS-DOS. The operation of the MS-DOS/PC-DOS (DOS) is well understood by those skilled in the art and the technical features of the operating system are documented in the IBM "Disk Operating System Technical Reference", version 5.00.

A hard (fixed) disk typically has multiple disk platters. Each platter is coated with magnetic material and typically one magnetic disk head per platter surface is provided to record data onto the platter surface. Each of the disk heads are mounted on a common arm which is moved in discrete increments to locate the heads on a particular disk cylinder. A cylinder is comprised of all the disk tracks that line up under a head. For example if a disk has two platters and therefore four disk heads, there would be four tracks that make up a cylinder. Each track is divided into sectors with each sector storing multiple bytes of data. The number of sectors is determined when the disk is formatted by a format program.

Allocation of disk space for a file (in the disk data area) is done only when needed. That is, the data space is not preallocated. The space is allocated one cluster (unit of allocation) at a time where a cluster is one or more consecutive disk sectors. The clusters for a file are "chained" together, and kept track of, by entries in a File Allocation Table (FAT).

The clusters are arranged on the disk to minimize the disk head movement. All of the space on a track (or cylinder) is allocated before moving on to the next track. This is accomplished by using the sequential sectors on the lowest-numbered head, then all the sectors on the next head, and so on until all sectors on all heads of the cylinder are used. Then, the next sector to be used will be sector 1 on head 0 of the next cylinder.

For a hard (fixed) disk, the size of the FAT and directory are determined when a disk format program initializes the disk, and are based on the size of the DOS partition. To locate all of the data that is associated with a particular file stored on a hard disk, the starting cluster of the file is obtained from the directory entry, then the FAT table is referenced to locate the next cluster associated with the file. The FAT table is a linked list of cluster pointers such that each 16-bit FAT entry for a file points to the next sequential cluster used for that file. The last entry for a file in the FAT has a number which indicates that no more clusters follow. This number can be from FFF8 to FFFF (base 16) inclusive. The size of a cluster is defined when the disk is formatted and can range from 1 to 128 sectors. Each sector of a FAT can point to 256, 512, ..., or 32768 sectors depending of the number of sectors in a cluster. The number of sectors that a FAT sector can point to is called a "track group". For redundancy reasons, two identical FATs are provided on the disk.

FIG. 1A shows a directory entry 2 consisting of 32 bytes of data. The name of the file and its extension are stored in the first 11 bytes (4) of the directory entry 2 and a file attribute byte 6 is provided. By definition, 10 bytes 8 are reserved for future use and 2 bytes are provided to store time 10 and date 12 information. Cluster bytes 14 point to the first cluster of sectors used to store the file information and the bytes 14 point to the first entry of the FAT table 16 associated with the file. The last 4 bytes 18 of the directory entry 2 are used to store the size of the file.

A 16 byte section of a FAT table 20 is depicted. The first 4 bytes 21 store system information. A two-byte pair, bytes 4 and 5 (16), are the beginning bytes of the FAT 20 used to track file information. The first cluster for data space on all disks is cluster "02". Therefore, bytes 4 and 5 (16) are associated with the first cluster of disk sectors "02" used to store file information. FAT bytes 6 and 7 (22) are associated with cluster 03 ... and bytes 14 and 15 (24) are associated with cluster 07.

This example illustrates how sectors associated with a file referenced in the directory are located. The cluster information bytes 14 in the directory 2 point to cluster number "02". The sectors in cluster "02" not shown, contain the first part of the data for the referenced file. Next the FAT table is referenced to see if additional clusters are used to store the file information. FAT bytes 4 and 5 (16) were pointed to by the directory entry 14 and the information stored in bytes 4 and 5 (16) point to the next cluster used for the file. Here the next cluster is "05". So, cluster "05" contains the next part of the data for the referenced file. FAT bytes 10 and 11 (26) contain an end-of-file number "FFFF" indicating there are no more clusters associated with the referenced file. All of the information associated with the referenced file was contained in clusters "02" and "05" on the disk.

FIG. 1B shows a schematic view of the organization of the two FATs and the directory on a simple disk. The disk 102 has an outside track 104 which contains the first FAT information. The next inner track 106 contains the second FAT information. The next sequential track 108, toward the center of the disk, contains the directory information. The outer most (track 0) of the disk, not shown, is reserved for the storage of the computer boot up instructions.

FIG. 2 shows a graphical view of the storage area of the disk in FIG. 1. The information for the FATs 104 and 106 is stored in the first and second tracks shown and the information for the directory 108 is stored in the third track shown. The remaining storage area of the disk 202 is available for storing file information. Beginning with track 1, sector 1, the operating system uses up to 128 contiguous sectors for the first copy of the FAT 1 (104). The operating system then allocates an additional, duplicate contiguous space for the FAT 2 (106). After both FATs have been allocated, the operating system allocates the next 32 contiguous sectors for the root directory 108.

The simple disk illustrated in FIG. 1 and FIG. 2 has a single recording surface and would only have a single recording head. Therefore, a track would be equivalent to a cylinder. Also for simplicity, the directory 108 and the two FATs 104 and 106 are assumed to occupy a single track each. The disk is organized into logical blocks with each block representing a sector of the disk. If the disk was organized to have 5000 sectors total, then the disk would have 5000 logical blocks. In prior art disk drives, the logical blocks map linearly and sequentially to the physical track-sector locations.

FIG. 3 illustrates the process required to read a file from a disk. Since the disk is in constant use, on average, the heads of the disk can be considered to be located about midway 302 relative to the platter surface. The read process is as follows:

Step 1: Seek (move the heads) from the current position to read the file information in the directory.
Step 2: Seek and read the file information in the FAT 1.
Step 3: Seek and read the file data stored in the cluster of sectors in the data area of the disk. Repeat Step 2 if the file data are contained in an additional cluster.

The time the heads require to seek (seek time) is related to the distance the heads are required to move. Longer seeks therefore take longer to perform. Also, in normal use, the file information is read only from the FAT 1. As the disk is rotating, there is a latency (rotational latency) incurred between the time the head is located above the correct track and the time the proper sector is positioned under the head. On average, this latency is one-half the time it takes the platter to make one revolution. The ability to read data quickly is negatively impacted by the combined seek time and rotational latency.

FIG. 4 illustrates the process required to write data to a disk file. As in the example above, the heads are assumed to be in the middle of the disk where they were left from a previous process.

The write process is as follows:
Step 1: Seek and read the directory to get FAT information.
Step 2: Seek and read the information in the FAT 1 to find the location of an unallocated cluster.
Step 3: Seek and write one cluster of file data starting at the first sector of the cluster pointed to by the FAT 1 pointer.
Step 4: Seek and write updated information in the FAT 1.
Step 5: Seek and write updated information in the FAT 2 to mirror the data in FAT 1.
Step 6: Seek and read FAT 1 to get an additional cluster if required. If more than one cluster was required to store the file information, then repeat the process starting at step 3.
Step 7: Seek and write updated information into the directory such as the file name and the size of the file.

The write process requires many more seeks than the read process and therefore incurs more overhead in terms of seek times and rotational latencies. This overhead increases the overall response time of the disk drive system.

While disk drives have been improved to decrease the head seek time, the seek time and rotational latency still contribute significantly to the time it takes a disk to perform a read or write. What is needed in the industry is a disk drive with greatly reduced seek time and rotational latency.

SUMMARY OF THE INVENTION

The present invention improves the response time of a disk drive by greatly reducing the effective seek time of the disk heads and the effective rotational latency incurred waiting for the desired sector to pass under the disk head.

In a preferred embodiment, the logical blocks are mapped to new physical locations on the platter to reduce the seek and latency time associated with the operating system's need to cycle between the FAT, directory, and the file data areas of the disk. The directory sectors are physically located on the middle cylinder of the disk drive while the logical representation of the directory sectors to a host computer is unchanged. The FAT sectors are physically distributed to be next to the file data sectors which they serve and the two copies of the FATs are spatially distributed to opposite sides of the track such that the FAT 1 data are 180 degrees apart on a track from the FAT 2 data.

When a read process occurs, the drive logically maps the two FATs to one single FAT. Whichever FAT sector of the two available passes under the disk head first is the sector read. The FAT sectors retain their unique identity when a write process is performed.

The novel sector location method above reduces the head seek movement making the data access much faster. In addition, on a read process, the FAT accesses are reduced on average from one-half a rotation to one-quarter a rotation due to the mirroring of the FAT 1 and the FAT 2.

DETAILED DESCRIPTION OF THE INVENTION

This invention improves the performance of personal computer disk drives in the DOS and Microsoft Windows operating system environments. By a novel physical layout of important disk sectors, access time and rotational latency times are minimized. The logical construction of the disk drive, that is, the sector organization, appears to a host computer system unchanged from current, commonly available disks.

The physical disk layout depends upon the construction details of the disk drive itself but mainly the number of sectors per track and the total capacity of the disk. The physical layout of the disk drive data is accomplished by an embedded controller. This controller can be an Integrated Drive Electronics (IDE) controller, a Small Computer Systems Interface (SCSI), or another interface. Also a separate controller located between the host computer system's IO bus and a conventional disk drive could accomplish the required disk layout.

Figure 5:
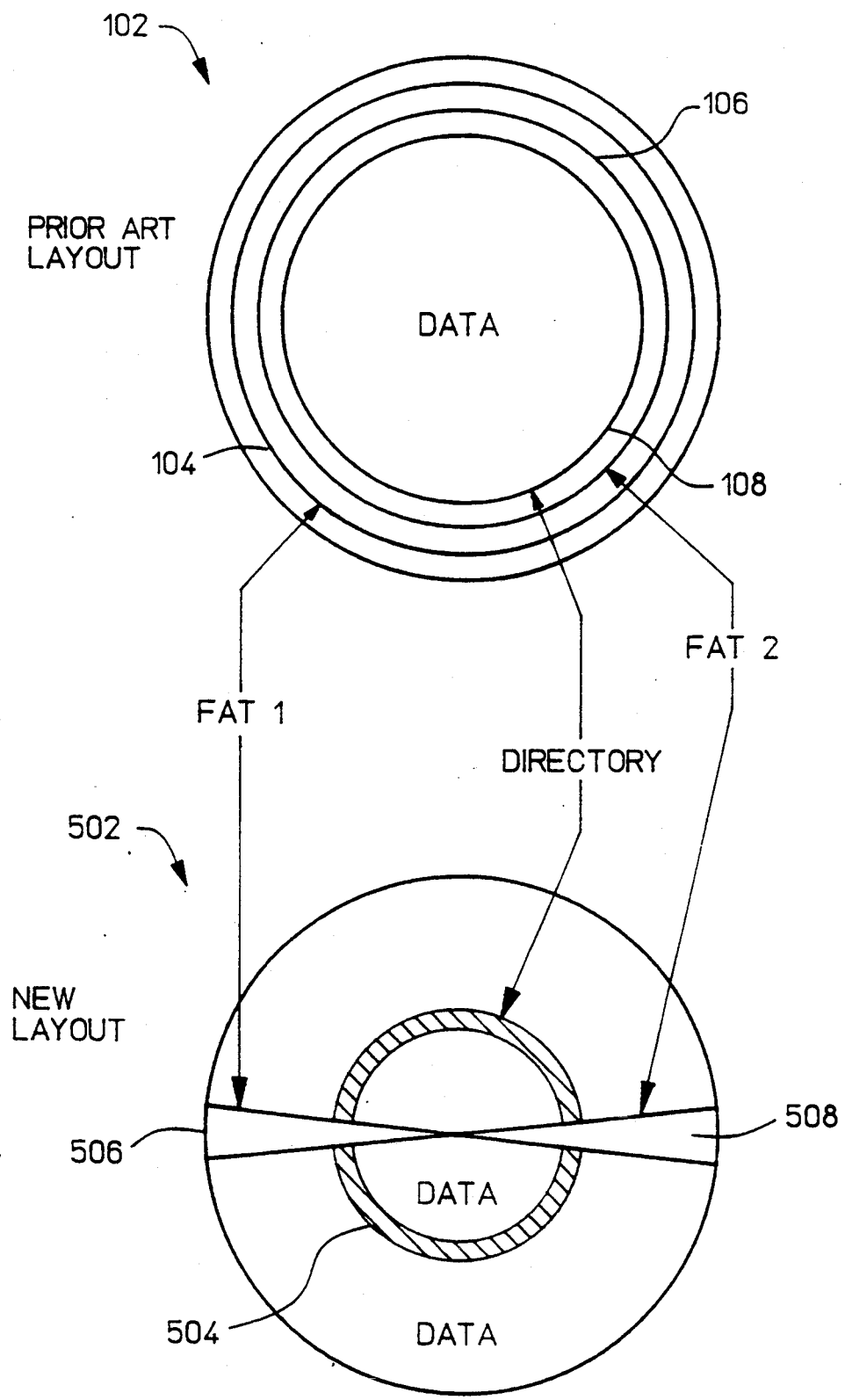
FIG. 5 shows a disk layout according to the present invention compared to a prior art disk layout.

FIG. 5 illustrates a disk 502 with the sectors organized according to the present invention. The prior art disk 102 is also shown for comparison purposes. Referring now to disk 502, the directory 504 is located on the middle track of the disk. FAT 1 (506) sectors are distributed across the disk such that the FAT 1 sectors are next to the data sectors they are associated with. FAT 2 (508) sectors are spaced 180 degrees from the equivalent FAT 1 sectors.

Figure 6:
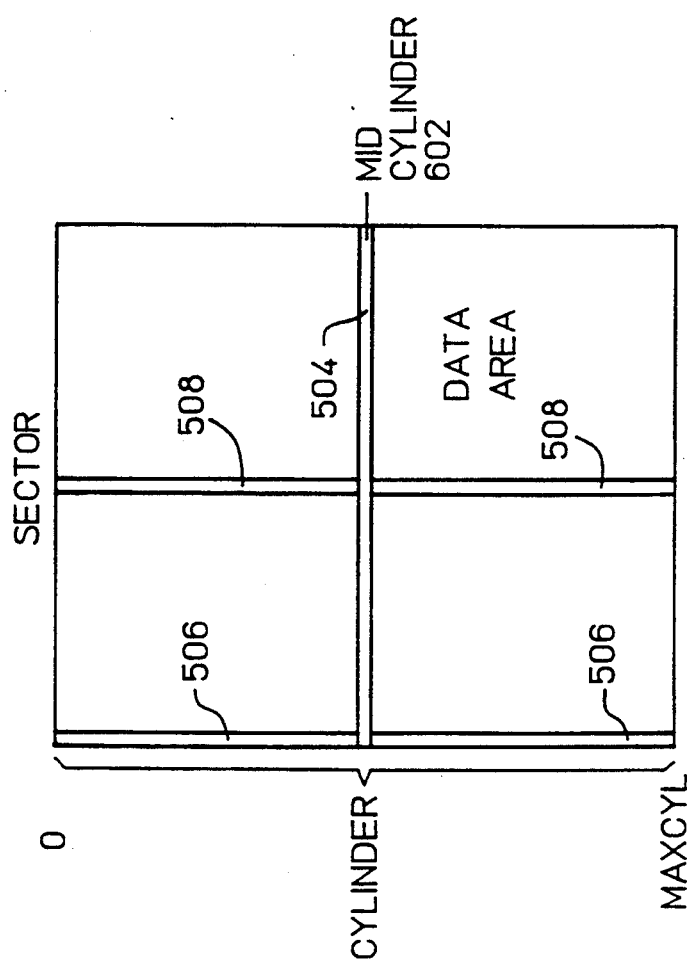
FIG. 6 is a graphical representation of a disk storage area organized according to the present invention.

FIG. 6 is a graphical representation of the disk 502 shown in FIG. 5. The directory is stored on the middle cylinder 602 of the disk. The FAT 1 (506) sectors and the FAT 2 (508) sectors are distributed generally linearly across the disk storage area. In addition, the FAT 2 sectors are spaced approximately one-half a track (measured in sectors) from the FAT 1 sectors.

The data and directory sectors, sectors other than FAT sectors, are mapped to begin at the physical midpoint of the disk media. For example, a disk with 2050 tracks would ordinarily have the first track, track 0, originate at the outside edge of the disk followed by track 1, track 2, . . . . A 2050 track disk organized according to the present invention would be mapped as follows:

| TRACK | PRIOR ART LAYOUT | NEW LAYOUT |
|---|---|---|
| 0 | Outside edge | Mid-track |
| 1 | Outside edge −1 | Mid-track +1 |
| 2 | Outside edge −2 | Mid-track +2 |
| ... | | |
| 1025 | Mid-track | Inside edge |
| 1026 | Mid-track +1 | Mid track −1 |
| 1027 | Mid-track +2 | Mid track −2 |
| ... | | |
| 2050 | Inside edge | Outside edge |

This new and novel layout of the disk sectors reduces the disk head seek time by approximately one-half as, on average, the disk heads will only have to travel one-quarter of the radius of the disk to read or write the directory information. In the prior art, the heads would have to travel, on average, one-half of the radius of the disk to seek to the directory information.

Additional benefits are realized during a file read process. A disk with a sector layout according to the present invention can read track group information from either the FAT 1 or the FAT 2. As there is now a choice of FAT sectors to read, the drive can use the first appropriate FAT sector that is positioned under the disk heads without regard to whether the sector belongs to the FAT 1 or the FAT 2. By spacing the FAT 1 and FAT 2 sectors 180 degrees apart on a track, the rotational latency is reduced from, on average, one-half a disk rotation period for a prior art disk to, on average, one-quarter of a disk rotation period for a file read process.

Figure 1A:
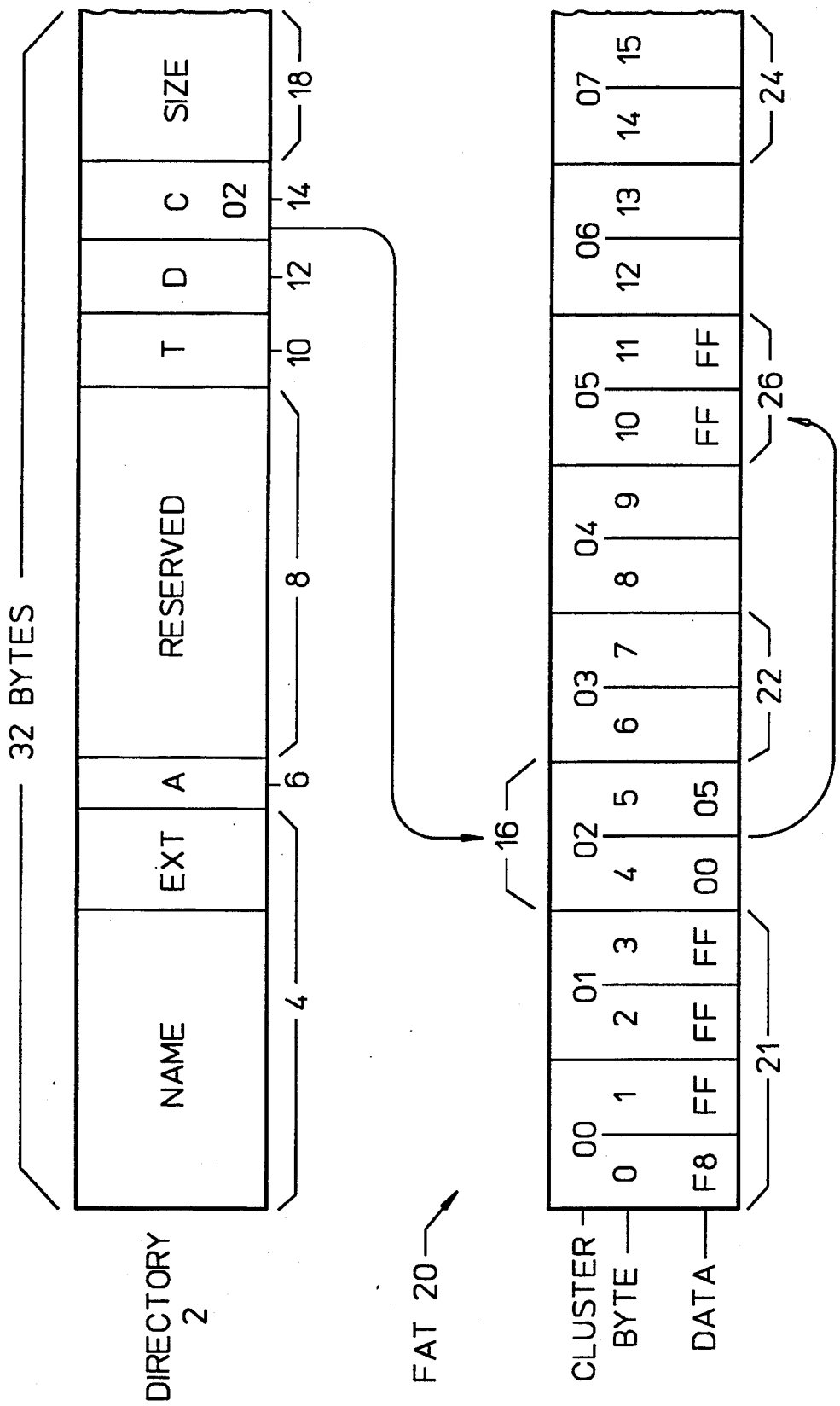
FIG. 1A illustrates the link between the directory cluster number and the FAT entries associated with a file.
Figure 1B:
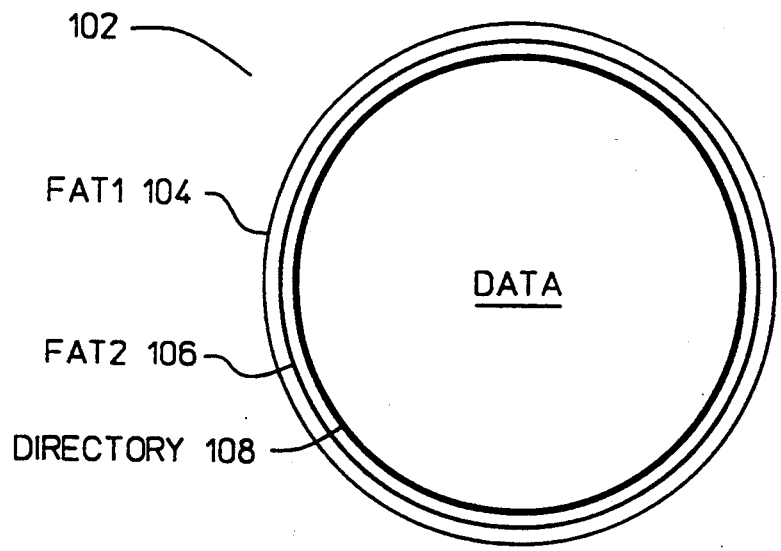
FIG. 1B illustrates the physical location of the FAT 1, FAT 2 and directory tracks on a disk platter according to the prior art.
Figure 2:
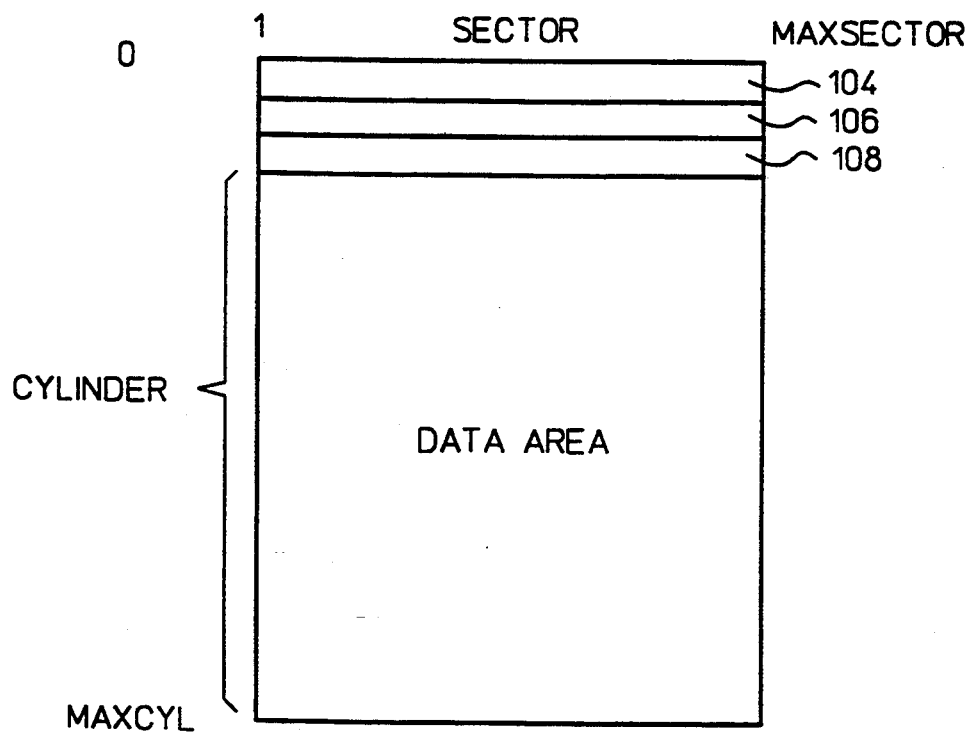
FIG. 2 is a graphical view of the storage space of a hard disk showing the locations of the FAT 1, FAT 2 and Directory information according to the prior art.
Figure 3:
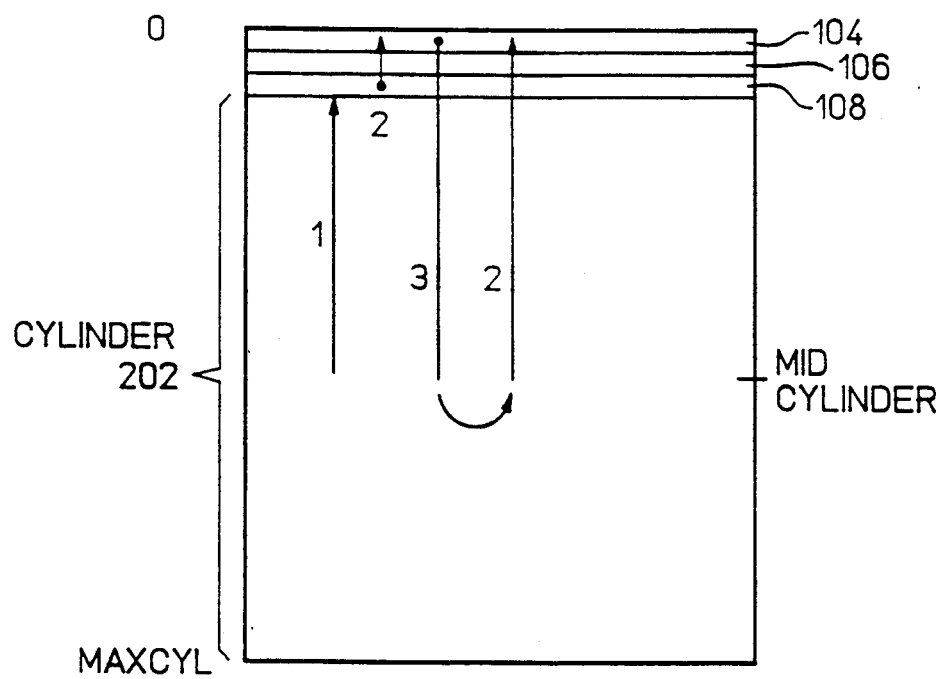
FIG. 3 illustrates a read file process according to the prior art.
Figure 7A:
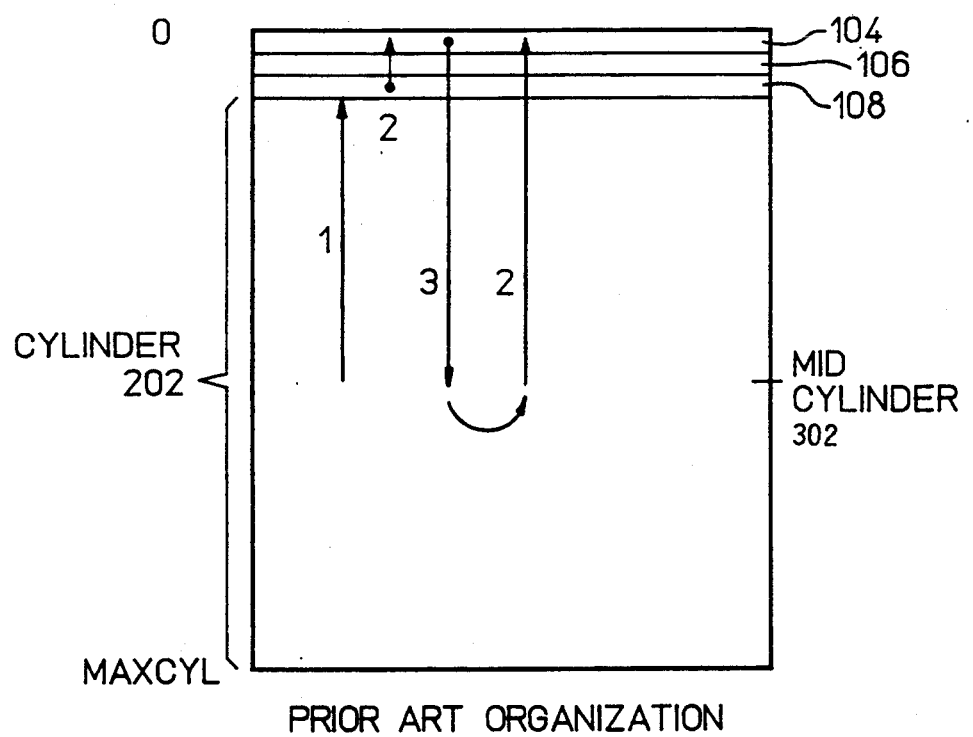
FIGS. 7A and 7B illustrate the differences between the prior art disk layout vs. a disk sector layout according to the present invention during a read file process.
Figure 7B:
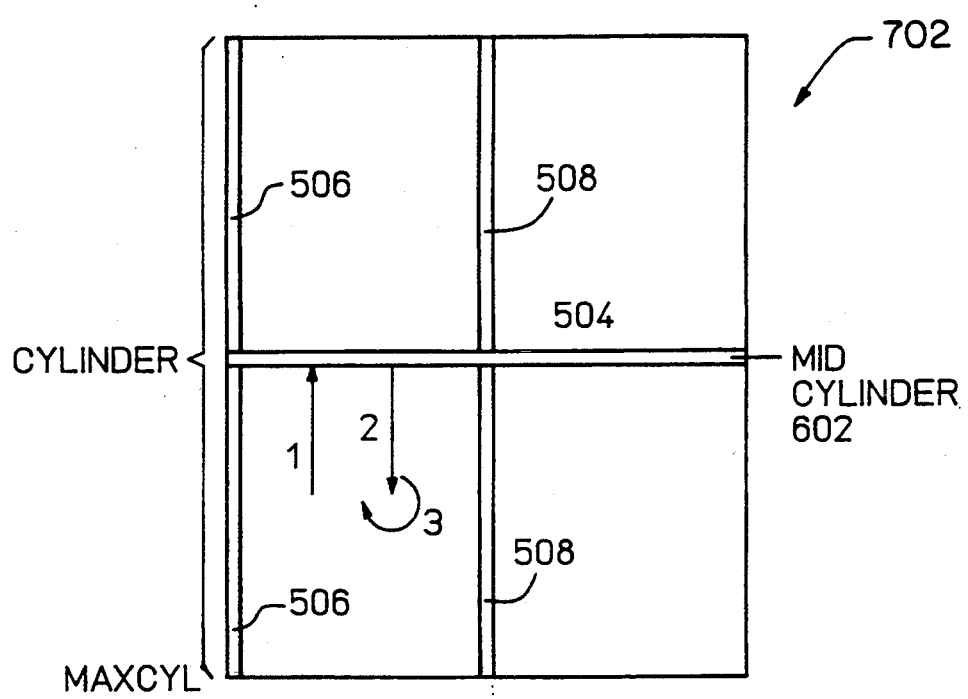

FIG. 7A is a copy of FIG. 3 and is included to make the comparison of the prior art and the new organization, FIG. 7B, convenient for the reader. The DOS read process was previously described for FIG. 3 above. Both FIGS. 7A and 7B show the required disk head movements required to read a file from the disk and the relative distances the disk head must move for each step (1–3) of the process. In the new sector layout shown by 702, a track group is equal to one track minus two sectors, one sector for each FAT (1 and 2). The difference between the distances the disk head must travel, for the prior art layout and the new layout, to read one track group, is summarized below.

| STEP | PRIOR ART ORGANIZATION | NEW ORGANIZATION |
|---|---|---|
| 1 | ¼ Disk Radius | ¼ Disk Radius |
| 2 | 2 Tracks | ¼ Disk Radius |
| 3 | ¼ Disk Radius | 0 Disk Radius |

The new layout cuts by more than half the distance the disk head must travel to read a track group compared to the prior art. This reduction in head movement directly results in a faster disk system. Also if the file is more than one track group in length, the advantages of the new layout are even more pronounced. In the prior art layout, the head must seek all the way back to the FAT 1 and then seek the track having the desired data. In the new layout the head only has to seek to the next adjacent track.

The rotational latency required to read the FAT information is also reduced by the new layout as either the FAT 1 or the FAT 2 information can be used. Therefore the rotational latency for the new layout is one-quarter of the disk rotation period. In contrast the prior art can only use the FAT 1 information and therefore the rotational latency is one-half of the disk rotation period.

Figure 4:
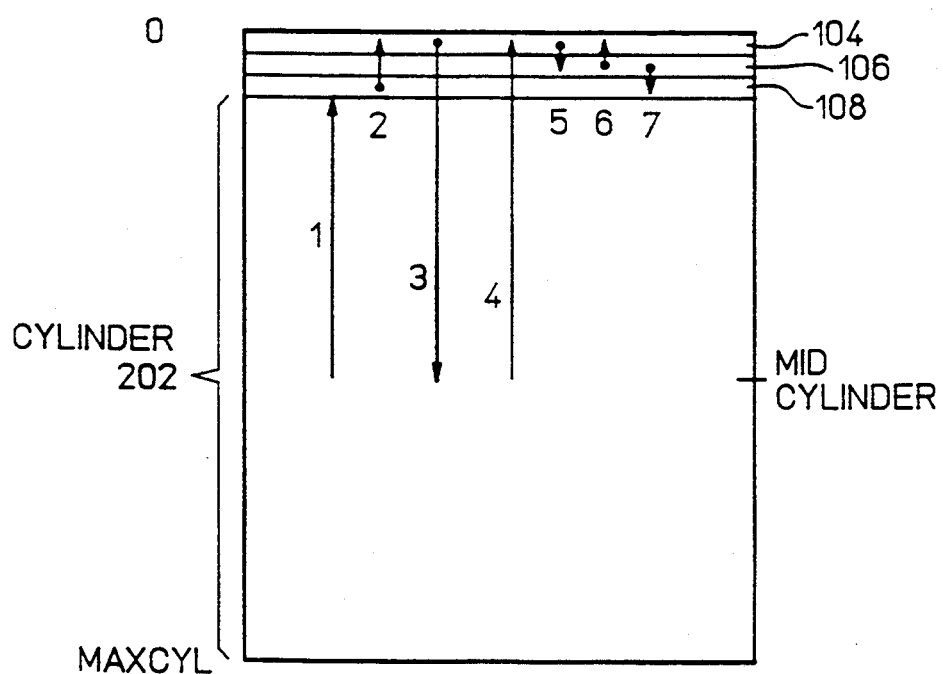
FIG. 4 illustrates a write file process according to the prior art.
Figure 8A:
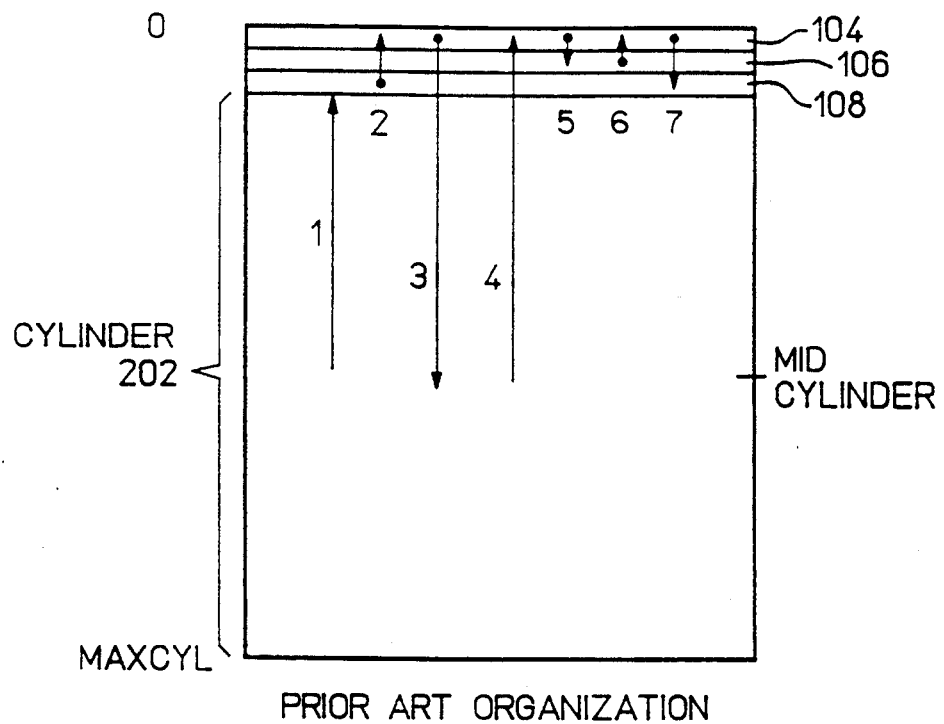
FIGS. 8A and 8B illustrate the differences between the prior art disk layout vs. a disk sector layout according to the present invention during a write file process.
Figure 8B:
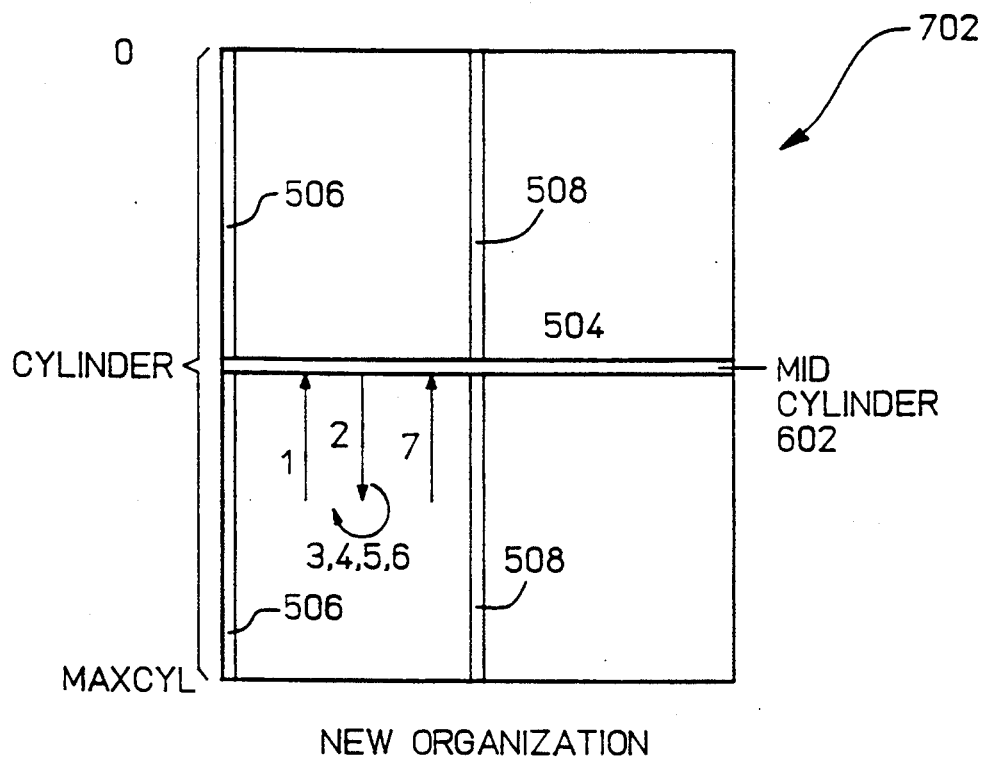

FIG. 8A is a copy of FIG. 4 and is included on the same sheet as FIG. 8B to aid the reader in comparing the prior art organization with the new organization, FIG. 8B. The DOS write process (steps 1–7) was previously described in association with FIG. 4 above. For this comparison, both the prior art disk organization and the new disk organization is the same as described for FIGS. 7A and 7B above. The difference between the distances the disk head must travel, for the prior art layout and the new layout, to write one track group, is summarized below.

| STEP | PRIOR ART ORGANIZATION | NEW ORGANIZATION |
|---|---|---|
| 1 | ¼ Disk Radius | ¼ Disk Radius |

-continued

| STEP | PRIOR ART ORGANIZATION | NEW ORGANIZATION |
| --- | --- | --- |
| 2 | 2 Tracks | ¼ Disk Radius |
| 3 | ½ Disk Radius | 0 Disk Radius |
| 4 | ½ Disk Radius | 0 Disk Radius |
| 5 | 1 Track | 0 Disk Radius |
| 6 | 1 Track | 1 Track |
| 7 | 1 track | ¼ Disk Radius |

With the prior art disk organization, the disk head must travel one and one-half the radius of the disk plus the cumulative distance of approximately 5 tracks. A disk organized according to the present invention reduces the head travel distance to ¾ the radius of the disk plus the distance of 1 track. In step 6 a disk using the new organization will have to step one track as the next FAT sector is on the next adjacent track. This significant reduction in disk head movement, due to the new sector organization, results in a faster disk system.

In FIGS. 7A, 7B, 8A and 8B, it is assumed the disk head is randomly located prior to the start of step 1. Also a write process using the new disk organization treats the two FATs as unique. That is, the redundancy of the FATs is maintained.

The examples shown above are presented to illustrate the principles of the invention. In practice a track group would consist of more than a single track and therefore FAT sectors would not be located on each physical track.

Figure 9:
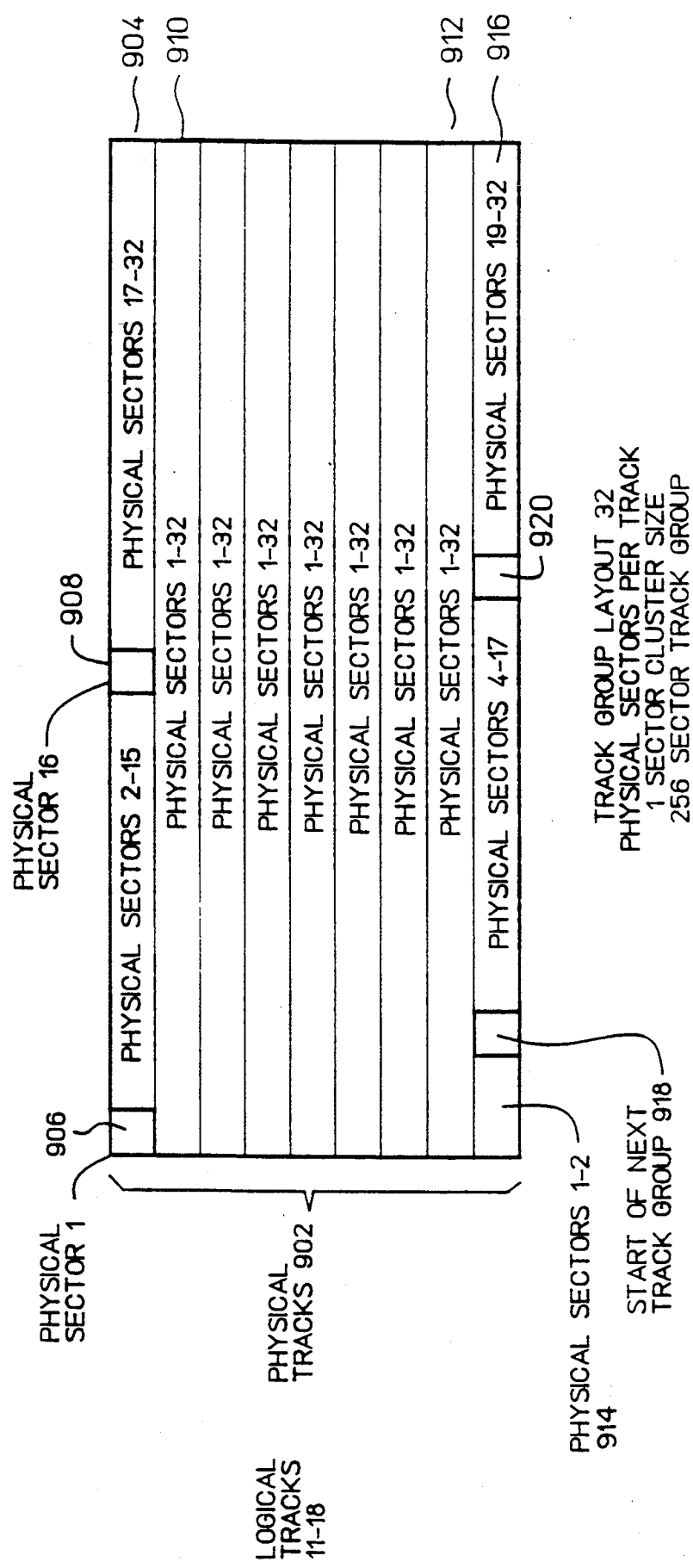
FIG. 9 illustrates a preferred disk organization according to the present invention.

FIG. 9 illustrates an example of disk organization according to the present invention. In this example nine physical tracks 902 are shown. The tracks are organized with 32 physical sectors per track and the cluster size is one sector. Each track group consists of 256 sectors and the disk has 2050 tracks total with physical tracks 1001–1009 illustrated.

Physical track 1001 (904) contains a FAT 1 sector 906 located on sector 1, and a FAT 2 sector 908 located on sector 16. Because two track 1001 (904) physical sectors are used for the FAT information, track 1001 is not a complete logical track. That is, track 1001 (904) only contains 30 of the 32 sectors of data area needed for a logical track. Therefore the 30 data area sectors from track 1001 (904) are combined with sectors 1 and 2 of the following physical track 910 to become a logical track 11. In this manner, logical track 18 includes sectors 3–32 from physical track 1008 (912) and two sectors 914 from physical track 1009 (916). The FAT 1 sector 918, physical sector 3 of physical track 1009, begins a new track group.

This novel organization provides each logical track group the FAT 1 sector, associated with the group, at the beginning of the track group. The FAT 2, associated with the track group, is also provided 180 degrees away from the FAT 1 sector on the same physical track as the FAT 1 sector. Given that the FAT 1 and the FAT 2 are 128 sectors in length, then the FAT 1 sector 1 (906) begins at logical track 1, sector 1, and the FAT 2 sector 1 (908) begins at logical track 5, sector 1. The second FAT 1 sector 918 begins at logical track 1 sector 2 and the second FAT 2 sector 920 begins at logical track 5 sector 2.

By organizing the disk sectors as taught above, efficient use of the disk capacity is achieved while maintaining the advantages obtained by minimizing disk head movement.

Figure 10:
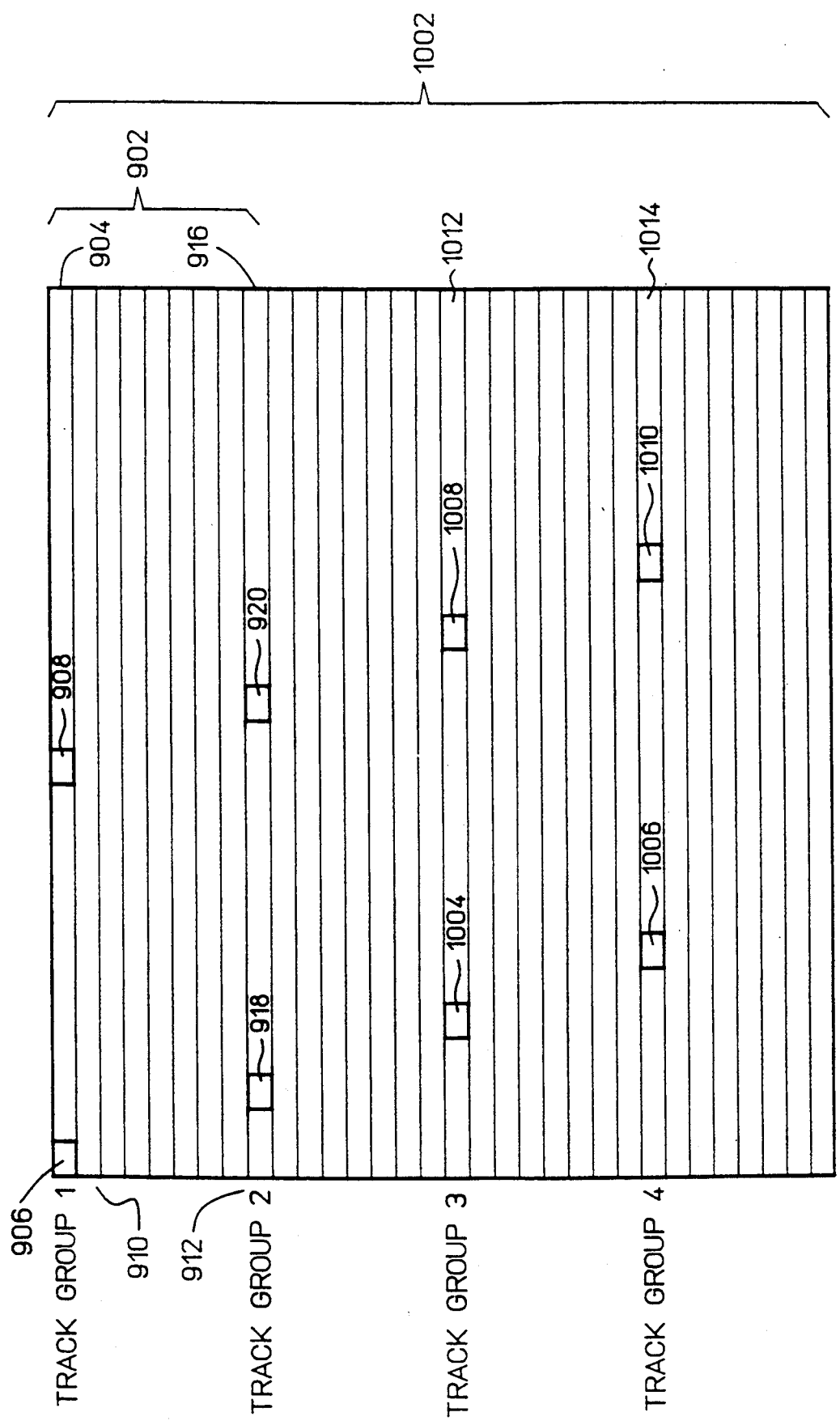
FIG. 10 illustrates the disk organization of FIG. 9 and incorporating four track groups.

FIG. 10 illustrates an extension of the disk organization of FIG. 9. The disk organization taught above is repeated throughout the drive until the entire storage space of the drive is organized into FAT/Track groups. 32 physical tracks 1002 are shown which incorporate track groups 1–4. The first nine tracks 902 are as described above for FIG. 9.

Each of the four track groups, in FIG. 10, has a FAT 1 sector (906, 918, 1004, 1006) preceding it. These FAT 1 sectors are located on logical track 1, sectors 1–4 respectively. The FAT 2 sectors (908, 920, 1008, 1010) are located on logical track 5, sectors 1–4 respectively. A physical track (904, 916, 1012, 1014) that has a FAT 1 sector also includes the associated FAT 2 sector located 180 degrees away from the FAT 1 sector.

To read a file contained in track groups 1 and 2, the drive head seeks the directory (not shown) and then seeks the physical track 904 containing the FAT 1 (906) and FAT 2 (908) sectors. The drive head reads the information from the first FAT sector, 906 or 908, that passes under the drive head. The drive head, already positioned on the correct physical track 904, now begins to read the data from the track group 1 starting with physical track 1001 (904), sector 2. The drive continues to step the drive head as required to read all 256 track group sectors.

The drive then moves the drive head to the FAT 1 sector 918 pointed to by the prior FAT 1 sector (906). Because of this novel sector arrangement, the drive head is already positioned on the correct physical track 916 to read the next FAT sector and therefore the drive head does not need to move. The first of the FAT sectors (918 or 920) to pass under the drive head is read and the drive head now reads all the data from track group 2.

By the FAT sectors being advantageously positioned relative to the track groups, considerable drive head movement is eliminated. Also because either the FAT 1 or the FAT 2 sectors can be utilized, rotational latency is significantly reduced from that experienced by prior drives organized according to the prior art.

The advantages of the present disk organization, over the prior art, in performing a write file process was previously described in association with FIGS. 8A and 8B. By locating the FAT sectors close to the associated track groups, significant disk head movement is avoided resulting in a faster responding disk drive system than in the prior art.

While the present invention has been described with reference to preferred embodiments, it will be apparent to one skilled in the art that modifications to the above teachings will yield advantageous results. For example, instead of locating the directory on the center track of the drive, the directory can be located close to the center and still achieve improved results over the prior art. Also, if the FAT sectors are relocated next to the associated track groups, even without relocating the directory, improved results will be achieved over prior art drive organizations. Many other changes and modifications can be made without departing from the spirit or scope of the invention as defined by the following claims.

I claim:

1. A method for tracking files on a disk storage device, the disk storage device having a plurality of physical tracks arranged in concentric circles on the disk, each physical track containing a first number of sectors, the sectors being grouped into clusters, each cluster containing a second number of sectors, the second number being at least one, the method comprising the steps of:

(a) storing in a directory, for each file, a reference to a cluster which stores at least a portion of the file;

(b) when a file is contained by more than one cluster, storing, in a file allocation table, references to any additional clusters which contain the file;

(c) distributing sectors of the file allocation table over physical tracks of the disk storage device so that every first sector containing a first portion of the file allocation table is located adjacent to clusters referenced by the first portion of the file allocation table contained in the first sector; and, (d) combining groups of sectors into logical tracks, each logical track including the first number of sectors, the logical tracks not including any sectors which contain a portion of the file allocation table, sectors within a logical track being consecutively arranged upon the disk storage device except that when any second sector containing a portion of the file allocation table is surrounded by sectors within a single logical track, the second sector is not reckoned as being within the single logical track.

2. A method as in claim 1 wherein step (c) includes, for each physical track on which a sector containing a portion of the file allocation table is to be located, placing two sectors containing a same portion of the file allocation table, the two sectors being located 180 degrees apart on the physical track.

3. A method as in claim 1 wherein step (a) includes placing the directory on a physical track which is approximately a middle track of the plurality of physical tracks.

4. A method as in claim 3 wherein in step (d), the logical tracks are identified by consecutive numbers starting from zero, wherein logical track zero consists of all sectors located on a physical track immediately outside the physical track on which the directory is placed and logical track one consists of all the sectors of the physical track on which the directory is placed.

5. A method as in claim 4 wherein in step (d) logical track three and following are consecutively located on physical tracks from but not including the physical track on which the directory is placed until, and including, an inside physical track on an inside edge of the disk storage edge, and remaining logical tracks are consecutively located on physical tracks beginning on an outside physical track on an outside edge of the disk storage edge until but not including the physical track containing logic track zero.

6. A method as in claim 5 wherein step (c) includes, for each physical track on which a sector containing a portion of the file allocation table is to be located, placing two sectors containing a same portion of the file allocation table, the two sectors being located 180 degrees apart on the physical track.

7. A disk storage device, comprising:

a plurality of physical tracks arranged in concentric circles on the disk, each physical track containing a first number of sectors, the sectors being grouped into clusters, each cluster containing a second number of sectors, the second number being at least one;

a directory, placed on a first physical track from the plurality of physical tracks, the directory containing references to files, each reference referencing a cluster which stores at least a portion of a file; and, a file allocation table, the file allocation table storing at least one additional reference to a cluster for every file for which a plurality of clusters are required to contain the file, the file allocation table being distributed over physical tracks of the disk storage device so that every first sector containing a first portion of the file allocation table is located adjacent to clusters referenced by the first portion of the file allocation table contained in the first sector;

wherein groups of sectors are combined into logical tracks, each logical track including the first number of sectors, the logical tracks not including any sectors which contain a portion of the file allocation table, sectors within a logical track being consecutively arranged upon the disk storage device except that when any second sector containing a portion of the file allocation table is surrounded by sectors within a single logical track, the second sector is not reckoned as being within the single logical track.

8. A disk storage device as in claim 7, wherein on each physical track on which a sector containing a portion of the file allocation table is located, two sectors of the physical track contain a same portion of the file allocation table, the two sectors being located 180 degrees apart on the physical track.

9. A disk storage device as in claim 7, wherein the directory is on a physical track which is approximately a middle track of the plurality of physical tracks.

10. A disk storage device as in claim 9, wherein the logical tracks are identified by consecutive numbers starting from zero, so that logical track zero consists of all sectors located on a physical track immediately outside the physical track on which the directory is placed and logical track one consists of all the sectors of the physical track on which the directory is placed.

11. A disk storage device as in claim 10, wherein logical track three and following are consecutively located on physical tracks from, but not including, the physical track on which the directory is placed until, and including, an inside physical track on an inside edge of the disk storage edge, and remaining logical tracks are consecutively located on physical tracks beginning on an outside physical track on an outside edge of the disk storage edge until but not including the physical track containing logic track zero.

12. A disk storage device as in claim 11, wherein on each physical track on which a sector containing a portion of the file allocation table is located, two sectors of the physical track contain a same portion of the file allocation table, the two sectors being located 180 degrees apart on the physical track.

* * * * *